(12) United States Patent
Westberg (10) Patent No.: US 9,277,457 B2
(45) Date of Patent: Mar. 1, 2016

(54) EFFICIENT DATA DELIVERY IN CELLULAR NETWORKS

(75) Inventor: Lars Westberg, Enköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 182 days.

(21) Appl. No.: 13/989,434

(22) PCT Filed: Nov. 26, 2010

(86) PCT No.: PCT/EP2010/068322
§ 371 (c)(1),
(2), (4) Date: May 24, 2013

(87) PCT Pub. No.: WO2012/069092
PCT Pub. Date: May 31, 2012

(65) Prior Publication Data
US 2013/0242946 A1    Sep. 19, 2013

(51) Int. Cl.
*H04W 36/00* (2009.01)
*H04W 36/02* (2009.01)
*H04L 29/12* (2006.01)
*H04W 8/26* (2009.01)
*H04W 40/36* (2009.01)

(52) U.S. Cl.
CPC ........ *H04W 36/0011* (2013.01); *H04W 36/023* (2013.01); *H04L 61/1511* (2013.01); *H04W 8/26* (2013.01); *H04W 40/36* (2013.01)

(58) Field of Classification Search
None
See application file for complete search history.

(56) References Cited

U.S. PATENT DOCUMENTS

| | | | |
|---|---|---|---|
| 2002/0112076 A1* | 8/2002 | Rueda et al. | 709/245 |
| 2004/0258053 A1* | 12/2004 | Toporek et al. | 370/352 |
| 2008/0313350 A1* | 12/2008 | Swinton et al. | 709/240 |
| 2010/0034089 A1 | 2/2010 | Kovvali et al. | |
| 2010/0130170 A1 | 5/2010 | Liu et al. | |
| 2010/0268814 A1* | 10/2010 | Cross et al. | 709/224 |
| 2010/0291943 A1 | 11/2010 | Mihaly et al. | |
| 2011/0136488 A1* | 6/2011 | Kuvvali et al. | 455/436 |

OTHER PUBLICATIONS

3rd Generation Partnership Project. 3GPP TR 23.829 V0.2.1 (Sep. 2009). 3rd Generation Partnership Project;Technical Specification Group Services and System Aspects; Local IP Access and Selected IP Traffic Offload; (Release 10) Sep. 2009, pp. 1-19.

* cited by examiner

*Primary Examiner* — Charles C Jiang
*Assistant Examiner* — George Atkins, Jr.
(74) *Attorney, Agent, or Firm* — Murphy, Bilak & Homiller, PLLC (57) ABSTRACT

Apparatus for use within a radio access network of a cellular communications network, where the cellular communications network belongs to an operator domain. The apparatus comprises a radio control unit for controlling radio channels within one or more cells of the radio access network, and a data source for maintaining or accessing data content, the data source being allocated in use an IP address that is unique at least within said operator domain. The apparatus further comprises an IP packet classifier configurable to inspect packets received from a client and to identify packets addressed to said IP address, and to redirect such identified packets to said data source. The apparatus also comprises an IP packet route selector configured to react to the establishment of a connection between a client and said data source by routing data content packets from said data source to the client via a radio channel or channels controlled by said radio control unit. The IP packet route selector is further able to react to a handover of the client to a peer apparatus responsible for a different set of radio channels by routing data content packets from said data source to the client via an IP backbone network.

18 Claims, 5 Drawing Sheets

EFFICIENT DATA DELIVERY IN CELLULAR NETWORKS

TECHNICAL FIELD

The present invention relates to an efficient data delivery method and apparatus for implementation within a cellular communications network. The invention is applicable in particular, though not necessarily, to such a method and apparatus that allows the efficient delivery of streaming data whilst providing for client mobility.

BACKGROUND

In 3G cellular communication architectures, data services are provided to subscribers using the General Packet Radio Service (GPRS). A GPRS core network routes data between a UMTS Terrestrial Radio Access Network, UTRAN, to which a client (User Equipment or UE) is attached and an IP backbone of the network operator. A so-called GPRS Gateway Support Node (GGSN) provides an interconnection between the GPRS core network and the IP backbone. The IP backbone provides client access to "internal" packet services of the network operator as well as access to the Internet and the various "external" services available over the Internet. The interface between the GGSN and the IP backbone is referred to in the relevant standards as the Gi interface. In the case of SAE/LTE network architectures, that is the so-called 4G networks, the Packet Data Network Gateway (PDN Gateway) within the Evolved Packet Core (EPC) network performs a role broadly similar to that of the GGSN, connecting the EPC to the operator's IP backbone.

Network operators are currently experiencing rapid growth in demand for data services, due in large part to the growing use of streaming media services. These services tend to be centralised "above" the GGSN/PDN Gateway anchor point in the sense that subscribers connect to common servers (hosting the services) regardless of geographical location. In order to reduce the burden placed on networks by this increased demand, it is desirable to allow for the local breakout of data connections such that data traffic does not have to flow unnecessarily through mobility tunnels, e.g. via a subscriber's home network to a visited network. It is further desirable to introduce where possible local data sources, i.e. local streaming servers and local caching, to reduce the path length between data source and subscriber.

Figure 1:
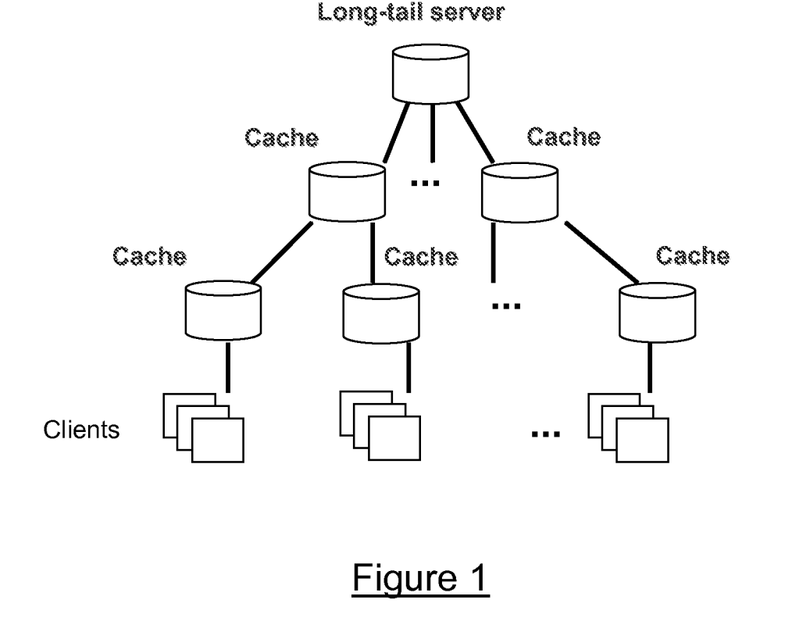
FIG. 1 illustrates schematically a data distribution network including caches located at various levels in the distribution network tree.

FIG. 1 illustrates schematically an example streaming media architecture with deployed caches used to offload the central server. The caches may be located within the Internet, within the IP backbone network, and/or within the operator's network. Considering the latter, in the case of a 3G network, caches could be located within the GPRS core network, for example co-located with or connected to the GGSN, or could be located within the RAN, for example co-located or connected to the Radio Network Controller (RNC). Similarly, in the case of a 4G network, caches may be located in the packet core network (co-located with or coupled to the PDN Gateway) or within the radio access network (co-located with or coupled to the enhanced Node B (eNB)).

Caching data beneath the GGSN/PDN Gateway attachment point, whilst efficient in terms of reducing network traffic, does raise issues regarding subscriber mobility. Subscriber mobility is a requirement for the introduction and acceptance of any data traffic handling solution. Operators and subscribers will not accept a solution which results in the loss of service connections when a subscriber moves from one location to another or is otherwise handed over between network access points. There is an inherent conflict between moving the cache as close as possible to the subscriber equipment in order to reduce network traffic on the one hand, and facilitating subscriber mobility on the other.

SUMMARY

It is an object of the present invention to allow the caching or sourcing of data within the radio access network such that subscribers can access that data whilst at the same time being allowed to switch attachment points without losing the connection to the data.

According to a first aspect of the present invention there is provided apparatus for use within a radio access network of a cellular communications network, where the cellular communications network belongs to an operator domain. The apparatus comprises a radio control unit for controlling radio channels within one or more cells of the radio access network, and a data source for maintaining or accessing data content, the data source being allocated in use an IP address that is unique at least within said operator domain.

The apparatus further comprises an IP packet classifier configurable to inspect packets received from a client and to identify packets addressed to said IP address, and to redirect such identified packets to said data source. The apparatus also comprises an IP packet route selector configured to react to the establishment of a connection between a client and said data source by routing data content packets from said data source to the client via a radio channel or channels controlled by said radio control unit. The IP packet route selector is further able to react to a handover of the client to a peer apparatus responsible for a different set of radio channels by routing data content packets from said data source to the client via an IP backbone network.

Embodiments of the present invention allow, in the case of a 3G network, a data source, e.g. a cache, to be located at the level of the RNC, thus significantly reducing the length of the data traffic path across the network, at least whilst a subscriber remains attached to the same RNC. In the event that a handover of the subscriber results in a change in the RNC to which the subscriber is attached, the connection to the same data source can be retained, albeit that the path length is increased. Considering the case of a 4G network, the solution is analogous but with the eNB replacing the RNC.

According to a second aspect of the present invention there is provided a method of delivering data content to a client that is attached to a radio access network of a cellular communications network, where the cellular communications network belongs to an operator domain. The method comprises storing data content within a data source provided at a radio network control entity, or making data content available to the data source, and allocating to the data source an IP address that is unique at least within said operator domain.

Packets received from a client are inspected to thereby identify packets addressed to said IP address, and the identified packets redirected to said data source. The establishment of a connection between a client and said data source is reacted to by routing data content packets from said data source to the client via a radio channel or channels controlled by said radio control unit. A handover of the client to a peer apparatus responsible for a different set of radio channels is further reacted to by routing data content packets from said data source to the client via an IP backbone network.

DETAILED DESCRIPTION

The above discussion recognises that, in the absence of an appropriate handover mechanism, locating a data cache or source at the level of the radio link control node, that is the RNC in the case of a 3G network and the eNB in the case of a 4G network (i.e. Long-Term Evolution, LTE), will effectively preclude the efficient handover of subscribers currently accessing the data cache or source. Existing data forwarding mechanisms (i.e. the Iur interface in 3G networks and the X2 interface in 4G networks) are not suitable for reliable and long term data forwarding. It is recognised here that the problem can be overcome by allocating a unique IP address to the local data cache or source such that, following the handover of the subscriber to a new radio link control node, that new radio link control node can inform the old radio link control node and instruct it to route data from the cache or source to the new radio link control node via the operator's IP backbone. The allocated IP address is unique at least within a given operator domain. In this example, an operator domain can be considered to be one or more networks under the control of a single network operator, or at least under the control of two or more operators between whose networks handovers of data connections are possible.

This solution involves the development of a radio-controlled dual interface solution that gives a simple routing solution when a subscriber terminal (User Equipment or UE according to 3G terminology) is moving outside the scope of a given radio link control node. The radio logic has a knowledge of whether or not the subscriber is within the "scope" of the data cache or source. The use of unique IP addressing ensures that traffic to the specific application is also routed via the IP-backbone.

Figure 2:
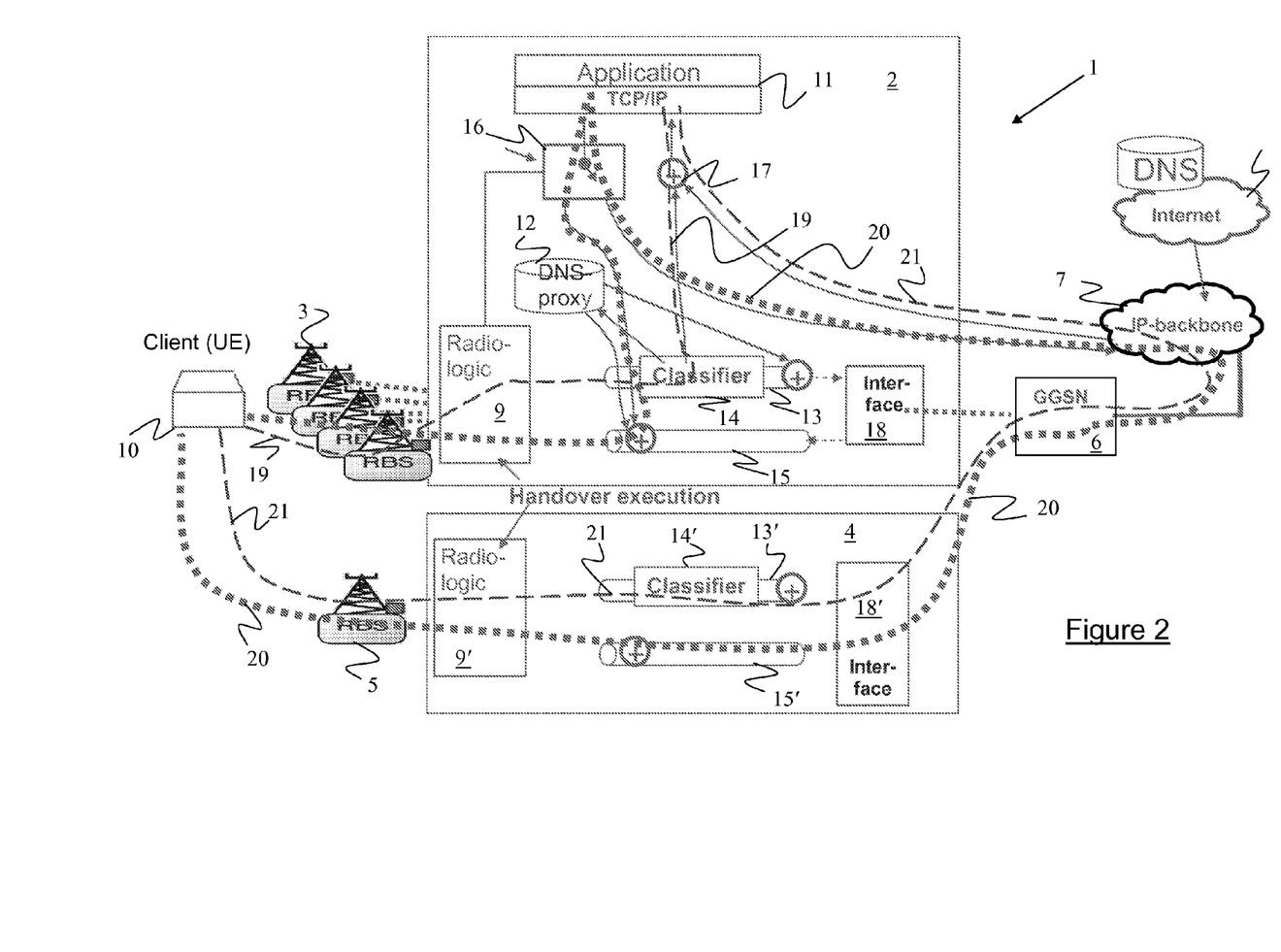
FIG. 2 illustrates schematically peer Radio Network Controllers of a 3G cellular network, with provision for local data caching.

FIG. 2 illustrates schematically this mobility solution in the context of a 3G network operated by a given network operator. This network forms part of an operator "domain", 1. Network components illustrated in FIG. 2 include a first RNC 2 configured to control a first plurality of Radio Base Stations (RBSs) 3, and a second RNC 4 configured to control a second plurality of Radio Base Stations (RBSs) 5. Only one of the second plurality of RBSs is illustrated in the Figure. The network further comprises a General GPRS Support Node (GGSN) 6 that is located within a GPRS core network part of the operator's network. The GGSN 6 interconnects the GPRS core network to an IP backbone network 7 within the same operator domain. The IP backbone network is in turn connected to the Internet 8.

Considering further the first RNC 2, this comprises radio logic 9 (also referred to here as a "radio control unit") which is responsible for establishing and controlling Radio Access Bearers (RABs) used to send and receive data (and other) traffic to subscriber terminals (User Equipment or UEs according to 3G terminology). A single UE 10 is shown in FIG. 2 and is assumed to be currently communicating with the GPRS core network via an established Packet Data Protocol (PDP) context. This context is carried between the UE 10 and the first RNC 2 over one or more RABs, via one of the first plurality of RBSs 3. The 3G defined process for establishing PDP contexts and RABs will be well known to the person of skill in the art and will not be described further here. As well as performing the usual radio control functions, the radio logic 9 is configured to perform radio dependent switching of traffic flows within the RNC 2.

The RNC 2 illustrated in FIG. 2 further comprises the following functional components:

A local data source 11: This local data source is, for the purpose of the following discussion, a local cache. The local data source comprises an application that receives and responds to data requests from UEs and a TCP/IP layer. This local data source forms part of a "local service network" which might include further local data sources.

A local DNS proxy 12: This proxy maintains DNS records mapping locally available data to a unique IP address allocated to the local data source 11 (each other local data source of the local service network is allocated its own unique IP address). The DNS proxy is able to perform translation of an FQDN to a unique IP address for specific FQDNs. Although the DNS proxy is shown within the RNC in FIG. 2, it may alternatively be located outside and connected to the RNC.

An uplink packet handler 13 including an IP packet classifier 14.

A downlink packet handler 15.

A IP packet route selector 16.

A packet concentrator 17.

An interface 18 connecting the RNC to the GPRS core network.

The second RNC 4 illustrated in FIG. 2 is functionally identical to the first RNC 2. However, to simplify the Figure, only components of the second RNC 4 that are relevant to the operation discussed in the following are shown. The components are identified with like reference numerals (to those used with respect to the first RNC 2), but differentiated with a prime, i.e. "'".

Considering further the packet classifier 14 of the uplink packet handler 13, the packet classifier 14 is configured to classify upstream packets based on one or more components of a five-tuple vector, that is IP address (source/destination), port (source/destination) and protocol. The classifier allows IP packets with a pre-defined five-tuple vector to be routed to the local service network. The classifier has one output coupled to the local DNS proxy 12 and one output coupled to the local data source 11. The classifier is configured in particular to identify DNS traffic in the uplink RAB by using the default (destination) port 53 and to direct such traffic to the local DNS proxy 12, and to identify traffic directed to the unique IP address and route that traffic (shown in FIG. 2 using the long dashed lines identified by reference numeral 19) to the local data source 11 via the packet concentrator 17.

The uplink packet handler 13 further comprises a packet insert function (marked with a "+" in the Figure) which allows insertion of packets from the local DNS proxy 12 directly into the uplink RAB. A similar packet insert function is provided in the downlink packet handler 15 for inserting packets received from the packet route selector 16 and the local DNS proxy 12.

To illustrate the optimised traffic handling approach presented here, consider a client (UE) 10 that is within the radio coverage of the RNC 2. RABs allocated to that UE 10 will be handled by a given one of the RBSs 3 controlled by the RNC 2. Assume further that the UE 10 has established a PDP context with the GGSN 6 (and in the process will have obtained its own IP address that is unique at least within the operator's domain) and that it initiates the use of a service (e.g. streaming video) by sending a DNS query to the network including a FQDN associated with the service. A simple DNS redirect approach is used to route traffic to the local data source. This involves the following steps:

1) The client 10 sends a DNS request to obtain the IP address of a FQDN.
2) The request is detected by the packet classifier 14 and is redirected to the local DNS proxy 12.
3) The DNS proxy 12 determines whether or not the FQDN is within the local service network.
   a. If yes, the DNS proxy replies to the client with the IP address of the local service. This IP address is unique at least within the operator's domain. [For different RNCs within the operator's domain, different IP addresses will be allocated to the same FQDN.]
   b. If the FQDN does not exist within the local service network, the DNS proxy forwards the request to the packet insert function within the uplink packet handler for forwarding to another DNS in the IP backbone or within the Internet. The response from Internet is routed as normal to the client via the downlink RAB. The local process stops here.
4) If the FQDN is a part of the local service network, the client receives the IP address allocated to the FQDN and starts to send traffic to that IP address. The packet classifier is configured to re-direct that traffic from the uplink RAB to the concentrator 17 which in turn routes the traffic to the local data source. It will be appreciated that, where different local data sources are available within the same RNC, some internal routing mechanism will be provided in order to route traffic to the correct local data source.
5) The radio logic 9 informs the packet route selector 16 that the client is currently served by a locally controlled radio bearer and, as such, the selector 16 is configured to route the traffic from the local data source 11 to the client via the downlink packet handler 15.

Figure 3:
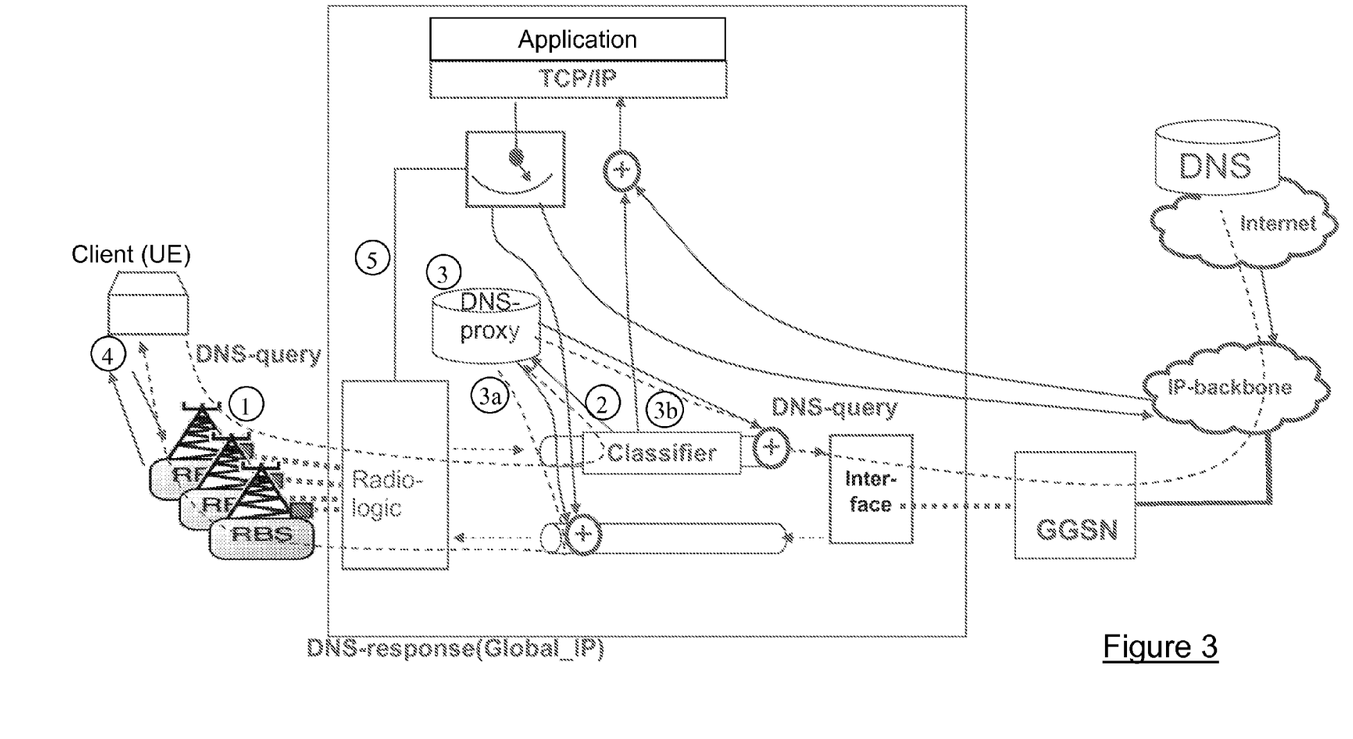
FIG. 3 illustrates schematically a DNS lookup handling process carried out with one of the Radio Network Controllers of the network of FIG. 2.

FIG. 3 further illustrates the procedure for handling DNS queries at the RNC, where the dashed lines indicate the flow of DNS traffic between the client and the local DNS proxy and between the client and an Internet based DNS server. The step numbers 1 to 5 used above are included in FIG. 3 (encircled).

It will be appreciated that the approach described with respect to FIGS. 2 and 3 allows the local data source to be located at or close to the RNC 2. The local data source 11 may itself comprise a database containing the data content, e.g. cached web pages, streaming media etc, or it may provide an interface to a content database coupled to the RNC. In the event that the client is handed off between RBSs 3 that are controlled by the same RNC 2, the client 10 is provided with content data from a local source such that that the traffic path is both short and efficient.

Consider now what happens when the client 10 moves out of the range of the RBSs 3 controlled by the first RNC 2 and moves into the range of a RBS 5 controlled by the second RNC 4. The known radio layer handover procedures are invoked and the client 10 detaches from the first RNC 2 and attaches to the second RNC 4. During this handover process, the radio logic 9 in the first RNC 2 is made aware of the handover and accordingly instructs the packet route selector 16 to switch so as to route traffic (in FIG. 2, the rerouted traffic is shown by the dotted line identified by reference numeral 20) toward the client 10 via the IP backbone 7 instead of the local RAB(s) (nb. the RNC has a "direct" interface to the IP backbone such that this traffic does not pass through the GGSN). These packets have as their destination address the allocated client IP address. With reference again to FIG. 2, this traffic is in fact routed across the IP backbone 7 to the GGSN 6 which in turn routes the traffic to the second RNC 4 to which the client 10 is now attached. As is also illustrated in FIG. 2, packets sent by the client 10 to the IP address of the local data source 11 are forwarded by the packet classifier 14' of the new RNC 4 to the IP backbone network 7 which in turn forwards them to the local data source 11 within the old RNC 2 (this traffic is shown in FIG. 2 by the dashed line identified by reference numeral 21). The classifier 14' within the new RNC 4 performs this function as it does not have any five-tuple vector matching these packets.

The data traffic flow path following handover of the client from the old to the new RNC is of course much longer than the previous local path. However, the new path is not significantly less efficient than the prior art routing path where the local data source is located above the GGSN, e.g. within the Internet. Moreover, as inter-RNC handovers are relatively infrequent, a local routing path will be used for the vast majority of service accesses.

Following an inter-RNC handover, new DNS queries will be directed by the packet classifier 14' within the (new) RNC 4 to the local DNS proxy (not shown) within that RNC, i.e. they will not be routed to the DNS proxy 12 within the old RNC 2. Thus, where possible, newly requested data content will be provided by a local data source that is local to the new RNC.

Figure 4:
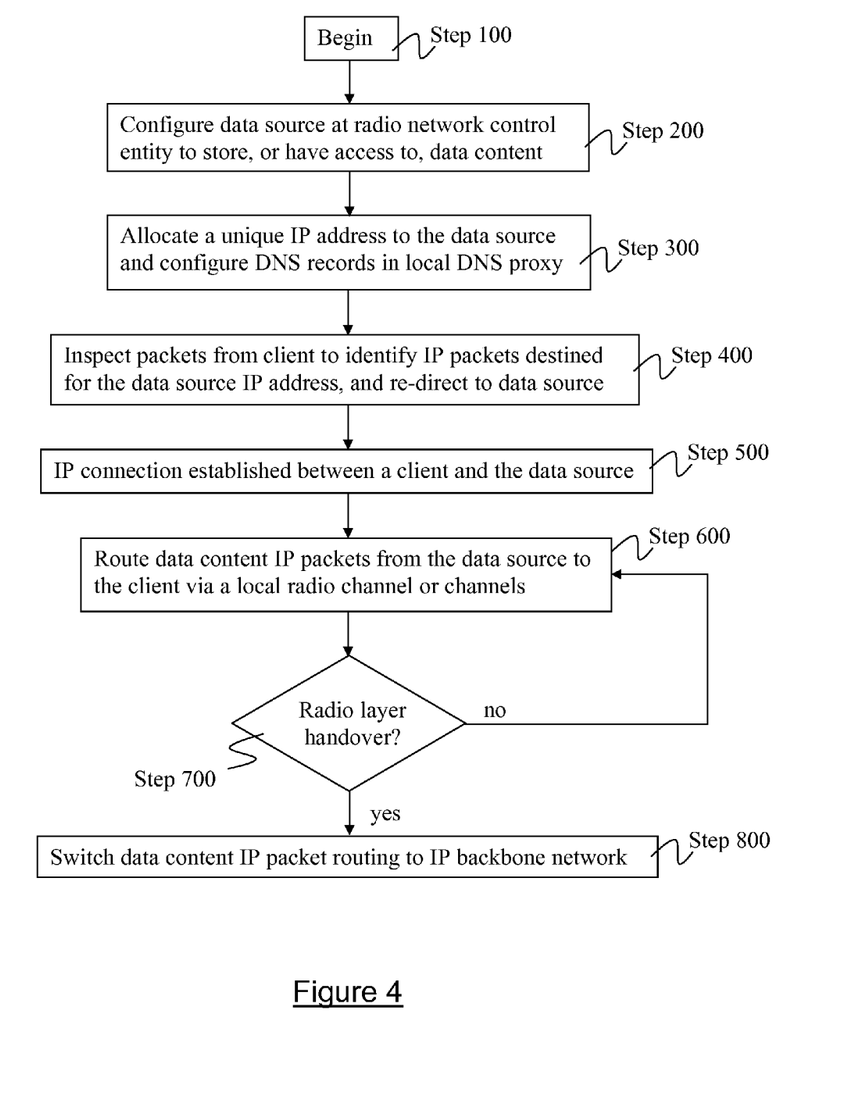
FIG. 4 is a flow diagram illustrating a method of providing locally cached data to a client within the network of FIG. 2.

FIG. 4 is a flow diagram illustrating this process for connecting a client to a local data source and for handling a subsequent mobility event, beginning at step 100. Considering a generic radio network control entity (an example of which is the 3G RNC), this entity is configured to store or have access to data content (step 200). At step 300, the local data source is allocated a unique IP address, and an appropriate record is created in the local DNS proxy, mapping a FQDN of the data content to that IP address. A record is created and stored in the DNS proxy for each data content entry stored or accessible to the local data source. All records however point to the same IP address (unless of course a plurality of local data sources are provisioned within the RNC, in which case each local data source is allocated a different unique IP address and the DNS records reflect this). This configuration step will also involve configuring the packet classifier 13 within the RNC with two new five-tuple vectors to be applied to packets on the uplink RAB(s), one vector matching to DNS queries (using port 53 as the trigger) and another matching to the allocated (local data source) IP address as destination address.

Once the configuration process has been completed, a client establishes appropriate uplink and downlink RABs, and sets up a PDP context between itself and the GGSN. The client is allocated an IP address as part of this context establishment process. At step 400, the client seeks to make an IP connection to the local data source. This is achieved using a DNS lookup using the local DNS proxy as described above. At step 600, following the setting of the packet selector to route packets from the local data source to the client via the local downlink RAB(s), packets corresponding to the requested content are sent to the client over the local radio channel(s).

This process continues until either there is no more content to be provided and the connection is terminated, or a radio layer handover is performed which results in the client detaching from the old RNC and attaching to a new RNC, step 700. In the latter case, the radio logic within the old RNC instructs the packet selector to switch downlink traffic for the client to the IP backbone network, step 800.

Figure 5:
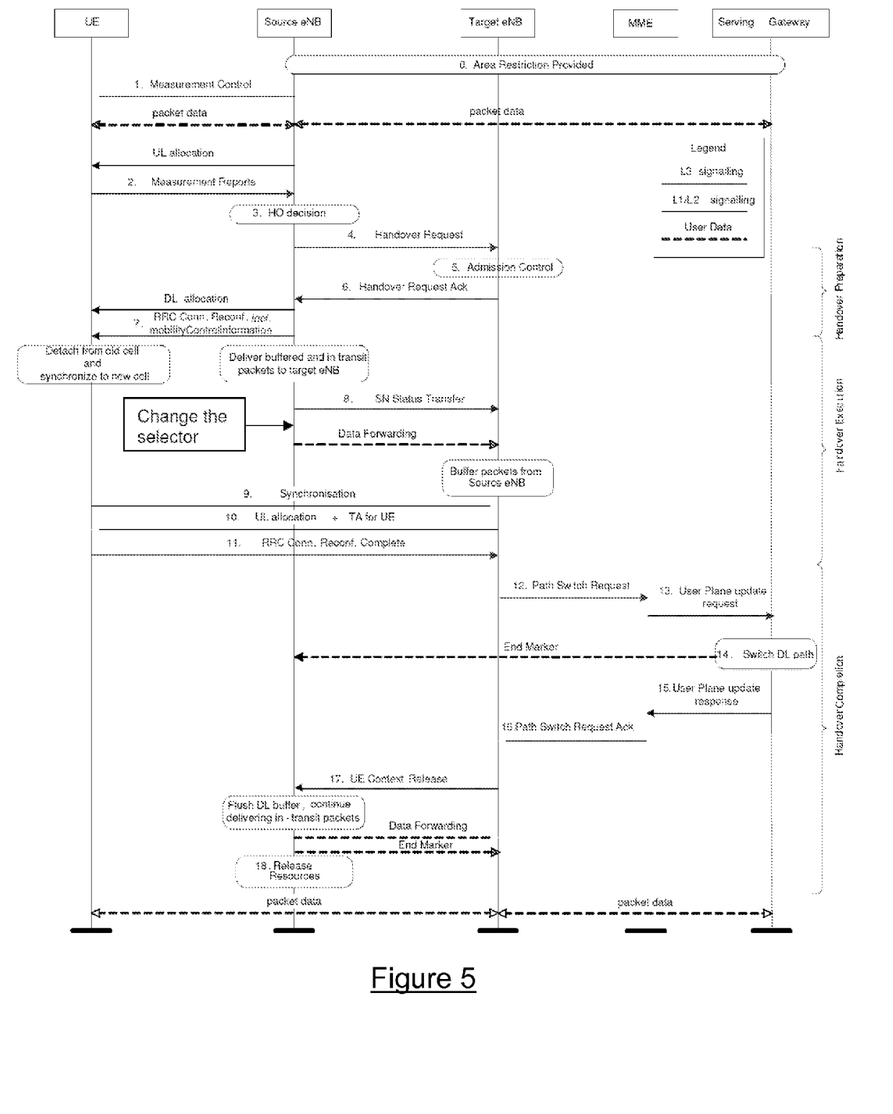
FIG. 5 illustrates a method of delivering data to a client from a local source, across a 4G network.

Considering now the implementation of this approach in the SAE/LTE (4G) architecture, 3GPP TS 36.300 ["Evolved Universal Terrestrial Radio Access (E-UTRA) and Evolved Universal Terrestrial Radio Access Network (E-UTRAN)] describes how the radio layer handover procedure is performed without involvement of the Evolved Packet Core (EPC) network. As such, messages sent to set up the handover are exchanged directly between the radio network control entities, i.e. the eNBs. The release of the resources at the source side during the handover completion phase is triggered by the eNB. FIG. 5 depicts the basic handover scenario where neither Mobility Management Entity (MME) nor Serving Gateway changes. The illustrated scenario assumes that the local data source, in this case a cache, forms part of the eNB. The "source" eNB is considered to be the old eNB from which the client (UE) is being handed over, whilst the "target" eNB is the new eNB to which the client is being handed over.

The steps depicted in FIG. 5 are described in more detail as follows:

0. The UE context within the source eNB contains information regarding roaming restrictions which were provided either at connection establishment or at the last Tracking Area (TA) update.

1. The source eNB configures the UE measurement procedures according to the area restriction information. Measurements provided by the source eNB may assist the function controlling the UE's connection mobility.

At this point, the user is attached to the EPC network and user packet data flows between the UE and the EPC.

2. The UE is triggered to send a MEASUREMENT REPORT by the rules set by system information, specification etc.

3. The source eNB makes a decision based on the MEASUREMENT REPORT and RRM information to hand off the UE.

4. The source eNB issues a HANDOVER REQUEST message to the target eNB, passing information necessary to prepare for the handover at the target side.

5. Admission Control may be performed by the target eNB.

6. The target eNB prepares for handover and sends the HANDOVER REQUEST ACKNOWLEDGE to the source eNB. As soon as the source eNB receives the HANDOVER REQUEST ACKNOWLEDGE, or as soon as the transmission of the handover command is initiated in the downlink, data forwarding may be initiated over the inter-eNB X2 interface. [As this data forwarding mechanism exists only for the duration of the handover process, it is not suitable for long term data forwarding, e.g. of streaming media.]

7. The source eNB generates the RRC message to perform the handover, i.e RRCConnectionReconfiguration message including the mobifityControlInformation towards the UE. The UE receives the RRCConnectionReconfiguration message and is commanded by the source eNB to perform the handover.

8. The source eNB sends the SN STATUS TRANSFER message to the target eNB to convey the uplink PDCP SN receiver status and the downlink PDCP SN transmitter status of E-RABs for which PDCP status preservation applies (i.e. for RLC AM).

At this stage, the radio logic within the source eNB instructs the selector within that eNB to switch downlink data traffic provided by the local data source to the IP backbone network. This traffic flow is not illustrated in FIG. 5, but it will be appreciated that the traffic is routed over the IP backbone to the Serving Gateway and from the Serving Gateway to the UE via the target eNB.

Steps 9 to 16 provide means to avoid data loss during handover and are further detailed in 10.1.2.1.2 and 10.1.2.3 of 3GPP TS 36.300.

It will be appreciated by the person of skill in the art that various modifications may be made to the above described embodiments without departing from the scope of the present invention.

The invention claimed is:

1. An apparatus for use within a radio access network of a cellular communications network, where the cellular communications network belongs to an operator domain, the apparatus comprising:
a radio control unit for controlling radio channels within one or more cells of the radio access network;
a data source for maintaining or for accessing data content, the data source being at the apparatus within the radio access network and being allocated in use an IP address that is unique at least within said operator domain;
an IP packet classifier configurable to inspect packets received from a client and to identify packets addressed to said IP address, and to redirect such identified packets to said data source; and
an IP packet route selector configured to react to the establishment of a connection between a client and said data source by routing data content packets from said data source to the client via a radio channel or channels controlled by said radio control unit, and to react to a handover of the client to a peer apparatus responsible for a different set of radio channels by rerouting data content packets from said data source to the client via an IP backbone network.

2. The apparatus according to claim 1, wherein said radio control unit is responsible for managing a handover of a client to a peer apparatus, the radio control unit signalling a handover event to said IP packet route selector and thereby causing the IP packet route selector to switch data content packets to said IP backbone network.

3. The apparatus according to claim 1, wherein said data source is a data content cache.

4. The apparatus according to claim 1, wherein said data source comprises a streaming server for streaming said data content.

5. The apparatus according to claim 1, wherein said IP packet classifier is configured to identify packets received from clients and relating to Domain Name System lookups, and to forward such packets to a local Domain Name System proxy.

6. The apparatus according to claim 5, wherein said IP packet classifier is configured to identify packets received from clients and relating to Domain Name System lookups by identifying packets having an IP destination port of 53.

7. The apparatus according to claim 5, further comprising a Domain Name System proxy, the Domain Name System proxy being configured to store mappings between said IP address and domain names identifying content held or accessible to said data source.

8. The apparatus according to claim 5, wherein the apparatus is configured to return a successful Domain Name System lookup response to a client via a radio channel or channels controlled by said radio control unit, and, in the case of a failed Domain Name System lookup, to forward the lookup to an external Domain Name System server via said IP backbone network.

9. The apparatus according to claim 1, wherein the apparatus is configured to operate as a Radio Network Controller within a UMTS Terrestrial Radio Access Network.

10. The apparatus according to claim 1, wherein the apparatus is configured to operate as an Enhanced Node B within a Long Term Evolution network.

11. A method of delivering data content to a client that is attached to a radio access network of a cellular communications network, where the cellular communications network belongs to an operator domain and the method comprises:
  storing data content within a data source provided at a radio network control entity within the radio access network, or making data content available to the data source;
  allocating to the data source an IP address that is unique at least within said operator domain;
  inspecting packets received from a client to thereby identify packets addressed to said IP address, and redirecting such identified packets to said data source; and
  reacting to the establishment of a connection between a client and said data source by routing data content packets from said data source to the client via a radio channel or channels controlled by said radio control unit, and reacting to the handover of the client to a peer apparatus responsible for a different set of radio channels by rerouting data content packets from said data source to the client via an IP backbone network.

12. The method according to claim 11, wherein said IP address is a unique IP address within the operator domain and at least one further domain.

13. The method according to claim 11, further comprising caching data content at said data source or at a data content server connected to said data source.

14. The method according to claim 11, further comprising detecting the handover of a client at the radio layer and responding to this detection by switching data content packets from said first mentioned radio channel or channels to said IP backbone network.

15. The method according to claim 11, further comprising:
  provisioning within a local Domain Name System, DNS, proxy server, DNS records mapping Universal Resource Identifiers to said IP address;
  identifying packets received from clients attached to said radio access network and relating to Domain Name System lookups; and
  forwarding such packets to the local Domain Name System proxy server.

16. The method according to claim 15, further comprising identifying packets received from clients and relating to Domain Name System lookups by identifying packets having an IP destination port of 53.

17. The method according to claim 15, further comprising providing said local Domain Name System proxy server at said radio network control entity.

18. The method according to claim 15, further comprising returning a successful Domain Name System lookup response to a client via a radio channel or channels controlled by said radio network control entity and, in the case of a failed Domain Name System lookup, forwarding the lookup to an external Domain Name System server via said IP backbone network.

* * * * *